United States Patent
Hanschke et al.

(10) Patent No.: US 10,936,000 B1
(45) Date of Patent: Mar. 2, 2021

(54) MULTI-MODE HIGH VOLTAGE CIRCUIT

(71) Applicant: TEXAS INSTRUMENTS INCORPORATED, Dallas, TX (US)

(72) Inventors: Michael Ryan Hanschke, Dallas, TX (US); Filippo Marino, Tremestieri Etneo (IT); Sunglyong Kim, Allen, TX (US); Tobin Daniel Hagan, Plano, TX (US); Richard Lee Valley, Nashua, NH (US); Bharath Balaji Kannan, Merrimack, NH (US); Salvatore Giombanco, Cassaro (IT); Seetharaman Sridhar, Richardson, TX (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 0 days.

(21) Appl. No.: 16/552,739

(22) Filed: Aug. 27, 2019

(51) Int. Cl.
  *G05F 1/10* (2006.01)
  *G05F 3/02* (2006.01)
  *G05F 1/575* (2006.01)
  *G05F 1/565* (2006.01)

(52) U.S. Cl.
  CPC .............. *G05F 1/575* (2013.01); *G05F 1/565* (2013.01)

(58) Field of Classification Search
  CPC ................................. G05F 1/575; G05F 1/565
  USPC ......................................................... 327/540
  See application file for complete search history.

(56) References Cited

U.S. PATENT DOCUMENTS

| | | | |
|---|---|---|---|
| 7,803,643 B2 * | 9/2010 | Hall | H01L 23/5228 438/17 |
| 8,872,273 B2 | 10/2014 | Kawahara et al. | |
| 8,878,330 B2 | 11/2014 | Kawahara et al. | |

\* cited by examiner

*Primary Examiner* — Metasebia T Retebo
(74) *Attorney, Agent, or Firm* — Ray A. King; Charles A. Brill; Frank D. Cimino

(57) ABSTRACT

In an example, a circuit includes a first power switch device coupled between a voltage input and an output terminal, the first power switch device having a control input. A voltage divider circuit includes a first resistor and a second resistor. The first resistor is coupled between the voltage input and a sense node between the first resistor and the second resistor. The second resistor has a first terminal coupled to the sense node and a second terminal. A second switch device is coupled between the second terminal of the second resistor and an electrical ground terminal. A voltage clamp is coupled between the sense node and the electrical ground terminal.

20 Claims, 6 Drawing Sheets

MULTI-MODE HIGH VOLTAGE CIRCUIT

TECHNICAL FIELD

This disclosure relates to a multi-mode high voltage circuit.

BACKGROUND

Power conversion relates to converting electrical energy from one form to another. Power converters are used in a variety of applications and over a range of input and output voltages. In some examples, a power converter utilizes a controller to control the power conversion according to application requirements, which further can employ one or more regulation loops as part of the process. As a further example, high voltage controllers typically implement some form of high voltage startup for generating a sufficiently low supply voltage from a high voltage source for the initial startup of common medium to low voltage circuits. High voltage controllers further may be configured to perform high voltage sensing by accurately attenuating a high voltage source for one or more applications, such as fault detection, line feed forward, and or line reference creation with low voltage circuits.

SUMMARY

In one example, a circuit includes a first power switch device coupled between a voltage input and an output terminal, the first power switch device having a control input. A voltage divider circuit includes a first resistor and a second resistor. The first resistor is coupled between the voltage input and a sense node between the first resistor and the second resistor. The second resistor has a first terminal coupled to the sense node and a second terminal. A second switch device is coupled between the second terminal of the second resistor and an electrical ground terminal. A voltage clamp is coupled between the sense node and the electrical ground terminal.

In another example, a device includes a startup circuit and a sensing circuit. The startup circuit includes a first switch coupled between a voltage input and an output terminal, the first switch having a control input. The startup circuit also includes a current source in series with the first switch between the voltage input and the output terminal. The current source is configured to provide a startup current to the output terminal in response to the first switch being turned on during a first operating mode. The voltage sensing circuit includes a second switch connected in series with first and second resistors and a ground node. The second switch is configured to conduct current through the second resistor to form a voltage divider between the voltage input and the ground node during a second operating mode, such that the voltage divider provides a sensed voltage at an intermediate sense node thereof that is a fractional part of a voltage at the voltage input. The first and second operating modes are mutually exclusive for the device.

In yet another example, a system includes a first switch coupled between a voltage input and an output terminal. The first switch having a control input. A current source is in series with the first switch between the voltage input and the output terminal. The current source is configured to provide a startup current to the output terminal in response to the first switch being turned on during a startup operating mode. A feedback circuit includes first and second resistors coupled between the voltage input and a control input of the first switch. The feedback circuit is configured to regulate a voltage drop across the current source by controlling a voltage drop across the first resistor during the startup operating mode. A capacitor is coupled to the output terminal and configured to charge in response to the startup current. A voltage sensing circuit includes a second switch connected in series with the first and second resistors and a ground node. The second switch is configured to conduct current through the second resistor to form a voltage divider between the voltage input and the ground node during a sensing operating mode in which a sense node between the first and second resistors provides a sensed voltage that is proportional to a voltage at the voltage input. The sensing operating mode is mutually exclusive from the startup operating mode.

DETAILED DESCRIPTION

This disclosure relates to multi-mode high-voltage circuits, devices and systems configured to implement both high-voltage startup and high-voltage sensing. In an example, a startup circuit includes a first switch coupled between a voltage input and an output terminal, the first switch having a control input. A current source is coupled in series with the first switch between the voltage input and the output terminal. For example, the first switch may be implemented as a high-voltage (HV) laterally diffused metal oxide semiconductor (LDMOS) or another type of transistor arranged in a cascode configuration with the current source. The current source is configured to provide a startup current to the output terminal in response to the first switch being turned on during a startup mode. The startup circuit may further include a feedback circuit that includes first and second resistors coupled between the voltage input and the control input of the first switch. The feedback circuit is configured to regulate a voltage drop across the current source by controlling a voltage drop across the first resistor, which is used to dynamically bias the first switch during the startup operating mode. A voltage sensing circuit includes a second switch connected in series with the first and second resistors. A node between the first and second resistors defines a sense node. The second switch is configured to conduct current through a voltage divider, which includes the first and second resistors during an HV sensing mode. As a result, that the voltage divider provides a sensed voltage at the sense node that is a fractional part of a voltage at the voltage input.

Figure 1:
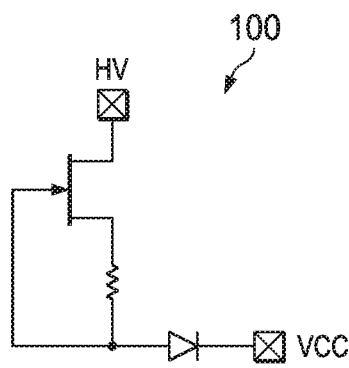
FIG. 1 is a simplified current source circuit.

FIG. 1 depicts a simplified diagram for a HV startup circuit 100 that includes a junction field effect transistor (JFET) in series with a resistor between an HV node and an output voltage node VCC. The JFET is source degenerated by a resistor to provide a relatively constant current. While this is a relatively simple implementation with only 1 HV device, its desired constant current operation may be compromised if JFET shares the same die with other ground referenced circuits because the substrate (JFET's backgate) may need to be tied to a ground terminal instead of VCC. Additionally, the VCC range and current sourcing capability may be too limiting for some applications that require both large sourcing current and large VCC charging voltages.

Figure 2:
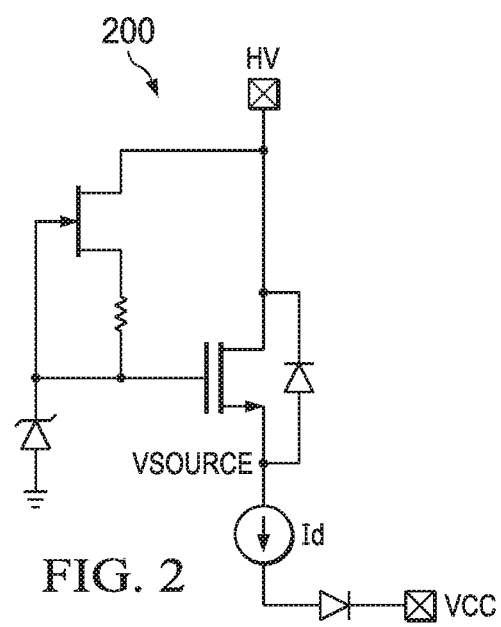
FIG. 2 is another current source circuit.

FIG. 2 depicts another type of startup circuit 200 to provide current and/or voltage to an output node VCC based on an input voltage provided at an HV node. In this approach, a source degenerated JFET is only used as a weak pull-up for an HV enhancement mode LDMOS. The LDMOS has a higher current carrying capability without VCC dependency because its body is tied to its source. A crude Zener Voltage (or some other constant bias voltage) can be used to statically bias an HV cascode formed by the LDMOS. However, the accuracy of the current/voltage sourced to VCC is very dependent on bias voltage implementation. Additionally, the circuit of FIG. 2 requires two very large high voltage devices, each having separate bond pads and bond wires.

Unlike the circuits in FIGS. 1 and 2, the circuits and devices disclosed herein (see, e.g., FIGS. 3-6) are able to implement multi-mode HV functions, such as including both HV sensing functionality in addition to HV startup. In an example, the devices and circuits can implement such multi-mode HV functions with the footprint of only a single HV device. This can result in significant area reduction compared to existing approaches. For example, an IC implementing the multi-mode HV circuit disclosed herein (see, e.g., FIGS. 3-6) can save approximately 50% in area compared to the approach in FIG. 2. Additionally, as disclosed herein, the startup circuit portion, which can be implemented with a single HV device, is capable of generating increased current during startup compared to the approach in FIG. 1. Moreover, accurate and continuous HV sensing functionality can be leveraged in the multi-mode circuit for various purposes, such as using the under/over voltage faults, line reference generation, line feed forward, and the like.

As used herein, the term "circuit" can include a collection of active and/or passive elements that perform a circuit function, such as an analog circuit or digital circuit. Additionally or alternatively, for example, the term "circuit" can include an integrated circuit (IC) where all or some of the circuit elements are fabricated on a common substrate (e.g., semiconductor substrate, such as a die or chip) or within a multi-chip module (e.g., within a single package). For example, the voltage regulator circuit and/or associated circuitry disclosed herein may be implemented on a respective IC chip.

Additionally, the term "couple" is used throughout the specification. The term may cover connections, communications, or signal paths that enable a functional relationship consistent with the description of the present disclosure. For example, if device A generates a signal to control device B to perform an action, in a first example device A is coupled to device B, or in a second example device A is coupled to device B through intervening component C if intervening component C does not substantially alter the functional relationship between device A and device B such that device B is controlled by device A via the control signal generated by device A.

Figure 3:
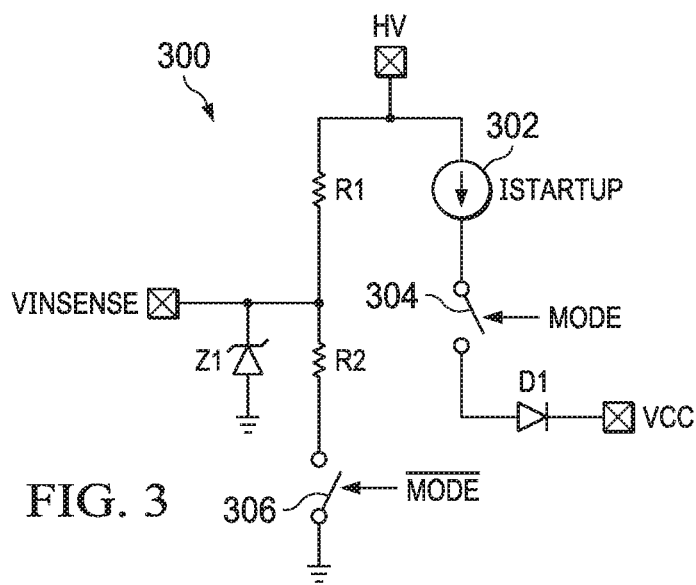
FIG. 3 is a functional diagram depicting an example of a multi-mode high voltage circuit configured to implement high-voltage startup and voltage sensing.

FIG. 3 is a functional schematic diagram depicting an example of a multi-mode high voltage control circuit 300 configured to implement high-voltage startup and voltage sensing. The circuit 300 includes an HV input node that is adapted to be coupled to an HV source. As used herein, HV refers to a voltage that is greater than the voltage rating of the devices that would normally be used to implement the switches, amplifiers, current sources, and or circuits that connect to the high voltage startup or sensing outputs. For example, the voltage range of HV can often refer to voltages greater than 20V, such as 30V, 120V, 300V, 700V, or more. The circuit 300 includes a current source 302 coupled in series with a switch 304 between the HV input node and an output node VCC. For example, the output node VCC is adapted to couple to medium to low voltage circuitry that utilize current and voltage VCC during startup until an associated HV controller has been activated to supply a desired voltage. A diode D1 can be coupled between the switch 304 and the output node VCC.

The circuit 300 also includes another switch 306 coupled in series with resistors R1 and R2 between the HV input node and an electrical ground terminal. In an example, the resistor R1 is implemented as a HV resistor. An intermediate node between resistors R1 and R2 is coupled to a VINSENSE node. A clamp, such as including a Zener diode Z1, is coupled between the VINSENSE node and the electrical ground terminal.

The switches 304 and 306 operate mutually exclusively, according to a mode signal that indicates the operating mode of the circuit 300. For example, an HV startup mode of the circuit 300 is enabled when the MODE signal is a logic 0, which causes the switch 304 to close and the output node VCC to source current equal to ISTARTUP. High Voltage Sensing is enabled when MODE is a logic 1, which causes the resistor R2 to conduct, forming a voltage divider between HV input and the electrical ground terminal. The voltage observed at VINSENSE thus is an attenuated representation of the voltage at the HV input node, which is approximately equal to HV*R2/(R2+R1). Also during the sensing mode (e.g., when MODE is a logic 1), the startup current ISTARTUP is terminated (e.g., ISOURCE=0).

Figure 4:
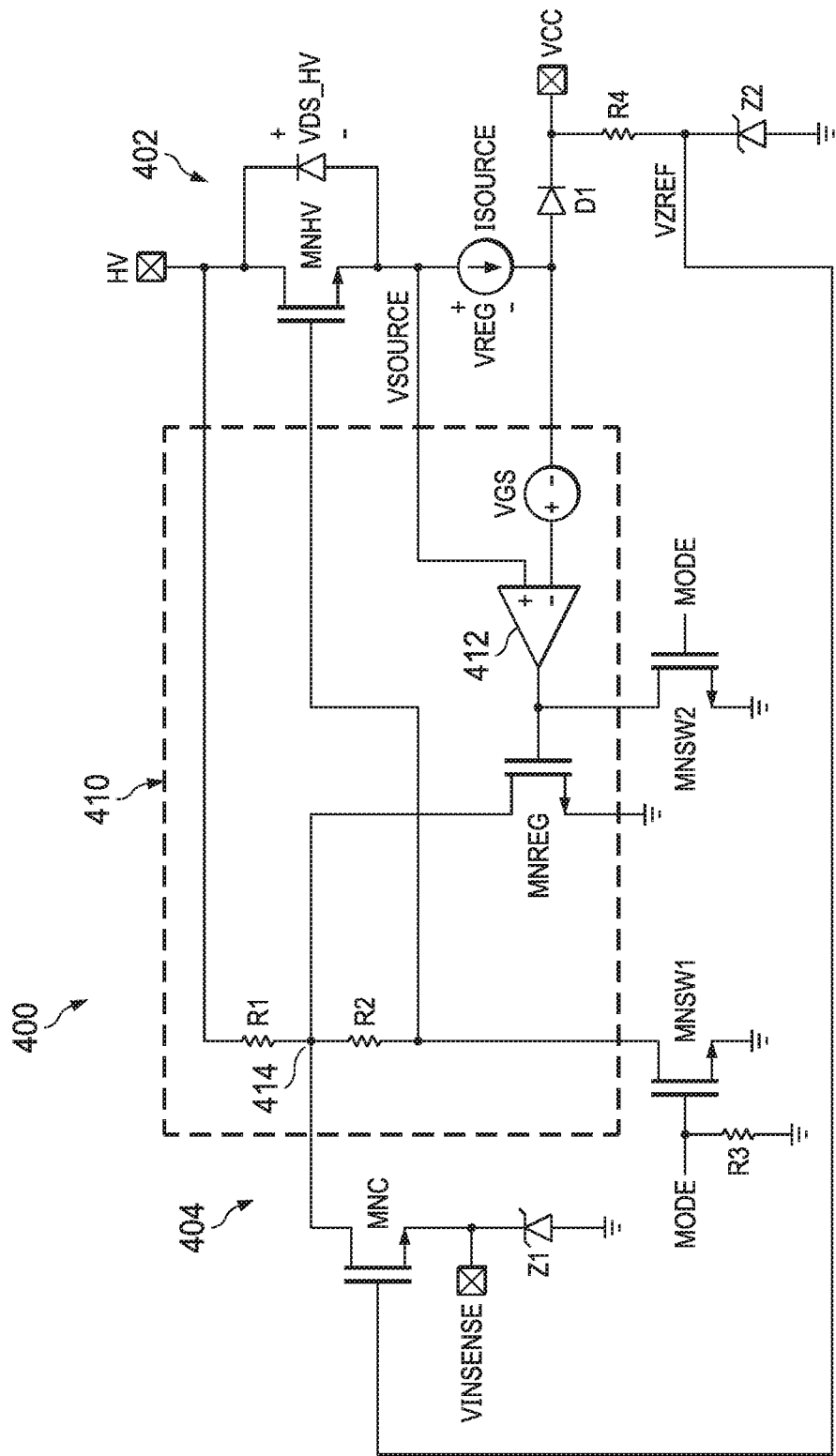
FIG. 4 is a circuit diagram depicting an example of a multi-mode high voltage circuit.

FIG. 4 depicts an example of a multi-mode HV control circuit 400, such as may be used to implement the circuit 300 of FIG. 3. The circuit 400 thus includes an HV startup circuit 402 and an HV sensing circuit 404 configured to implement control for HV startup and HV sensing modes, respectively. The mode is selected in response to a MODE signal, such as provided from an external controller (e.g., an HV controller—not shown). For example, the HV startup mode of operation is selected when the MODE signal is grounded (or low voltage), such as either by external biasing or due to the internal weak pull-down resistor R3. In the HV startup mode, the HV startup circuit 402 provides a large sourcing current (ISOURCE) to the output terminal VCC, such as to quickly charge a large external capacitor (not shown—but see, e.g., FIG. 5). The HV sensing mode is selected when the MODE signal is a logic 1(e.g., a high voltage), such as after the voltage at the output terminal VCC has reached a threshold voltage in response to the external capacitor being sufficiently charged. In the HV sensing mode, the HV sensing circuit provides an output voltage to a terminal VINSENSE, which is an attenuated version of the input voltage provided at the HV input terminal. Also during the HV sensing mode, the As an example, the HV startup circuit 402 includes an HV transistor MNHV coupled to the HV input terminal. The transistor MNHV has a drain coupled to the HV input terminal and its source coupled to a current source ISOURCE. A diode D1 is coupled between the current source ISOURCE and the output terminal VCC. In an example, the transistor MNHV is implemented as an n-channel LDMOS device having a high voltage (e.g., 700 V) rating. The transistor MNHV operates as a dynamically biased HV cascode for the current source ISOURCE during high voltage startup mode.

The dynamic bias of the transistor MNHV is implemented by a feedback circuit 410 that is configured to regulate a voltage VREG across the current source ISOURCE. For example, the feedback circuit 410 includes an amplifier 412 having inputs coupled across the current source ISOURCE. An offset voltage (e.g., a gate-to-source voltage (VGS)) is coupled between an inverting input of the amplifier and an output node of the current source ISOURCE to apply the offset to the voltage at the node between the current source and diode D1.

In an example, the voltage VSOURCE is used as a rail for the amplifier. As a result, the voltage at the gate of MNHV has to reach a large enough bias before the feedback loop 410 can become fully active. Conveniently, R1 also functions as a weak pull-up on the gate of MNHV, which causes the voltage VSOURCE to increase in an open loop manner until the amplifier reaches a high enough VSOURCE bias that it can take control of the voltage at the gate of MNHV.

An output of the amplifier 412 is coupled to a gate of a transistor MNREG. The transistor MNREG has a drain coupled to an intermediate node 414 of a divider circuit, such that MNREG is coupled between the node 414 and the electrical ground node. By connecting the drain of the transistor MNREG to the node 414 instead of the gate of MNHV, a DC voltage drop across R2 can be omitted, which helps reduce the maximum voltage at the internal node 414.

The divider circuit includes resistors R1 and R2 coupled in series between the HV input terminal and a node that is coupled to the gate of MNHV. The feedback circuit 410 thus is configured to regulate the voltage drop VREG across the current source ISOURCE to the offset voltage VGS by increasing or decreasing the voltage drop across the resistor R1 to increase or decrease the VSOURCE voltage so that VSOURCE is equal to approximately VCC+VGS. Voltage overstress at VSOURCE can be avoided by disabling high voltage startup (driving MODE high) before VCC equals the maximum VSOURCE voltage minus VGS.

As a further example, the HV sensing circuit 404 includes transistors MNSW1 and MNSW2, which operate as switch devices to control the operating mode of the circuit 400 based on the MODE signal. The transistor MNSW1 is coupled in series with the divider circuit (R1 and R2) between the HV input terminal and the electrical ground terminal. For example, R2 has a first terminal coupled to the sense node and a second terminal (e.g., the node between R2 and MNSW1). As mentioned, the second terminal of R2 is coupled to the gate of MNHV. A pulldown transistor R3 is coupled between the gate of MNSW1 and the electrical ground node to facilitate grounding the gate during the HV startup mode. The transistor MNSW2 is coupled between the output of the amplifier (also the gate of MNREG) and the electrical ground node.

A clamp circuit is coupled to the sense output terminal VINSENSE. The clamp circuit includes a transistor MNC coupled between the intermediate node 414 and the node corresponding to the output terminal VINSENSE. The clamp circuit also includes a Zener diode Z1 is coupled between output terminal VINSENSE and the electrical ground terminal. A resistor R4 and a Zener diode Z2 are coupled between the VCC node and the electrical ground node. The voltage VZREF across the Zener diode Z2 is coupled to bias the gate of the transistor MNC based on the voltage at the VCC terminal.

In an example where a maximum charging voltage at the terminal VCC is 28V and low voltage circuits connect to VINSENSE, the FETS MNC, MNSW1 and MNREG may be implemented using medium voltage devices (e.g., approximately 30V rating) and MNSW2 is implemented using a low voltage device (e.g., approximately 7V rating) and the Zener diodes Z1 and Z2 are implemented by Zener diodes having 7V Breakdown for the Zener diodes. In other examples, however, these voltage ratings can be adjusted according to application requirements, such as depending on the VCC and VINSENSE voltage range requirements.

Figure 5:
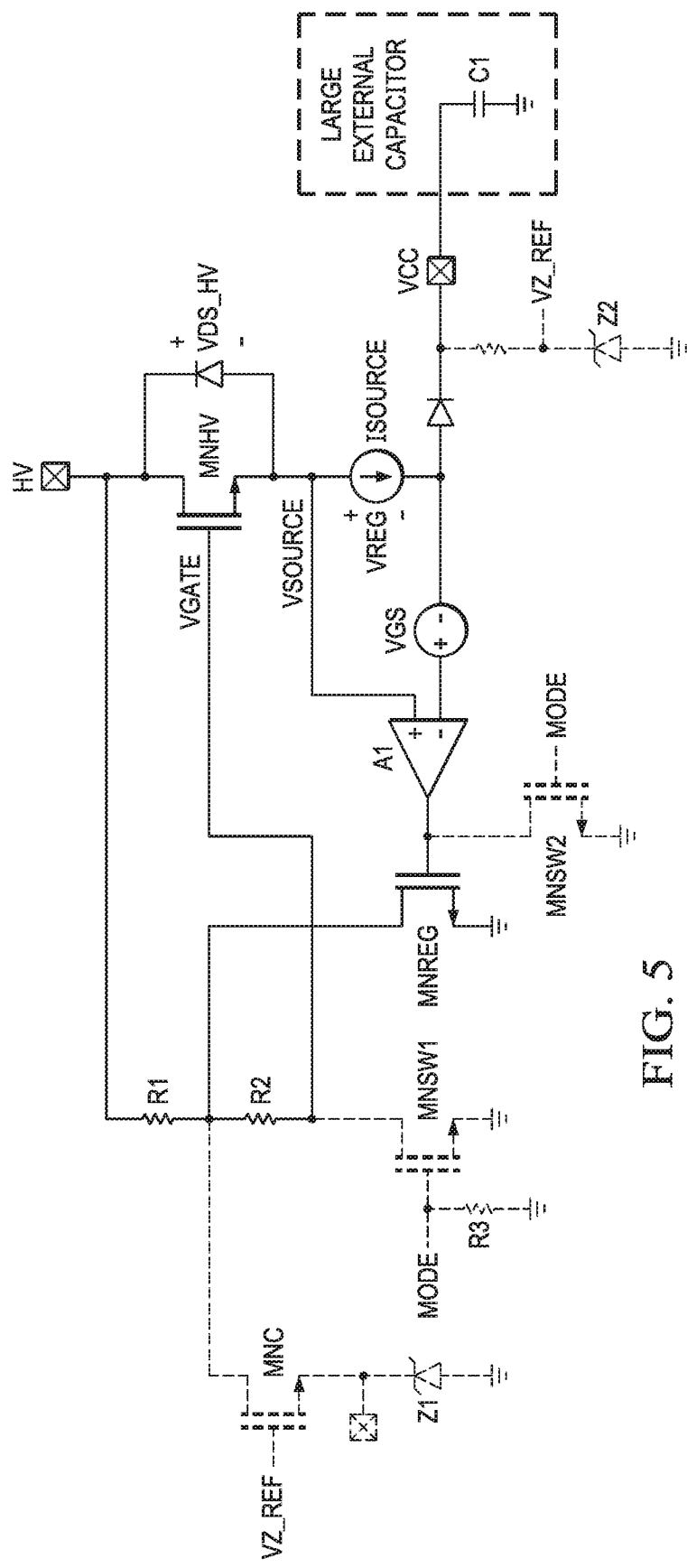
FIG. 5 depicts the circuit diagram of FIG. 4 operating in a high-voltage startup mode.
Figure 6:
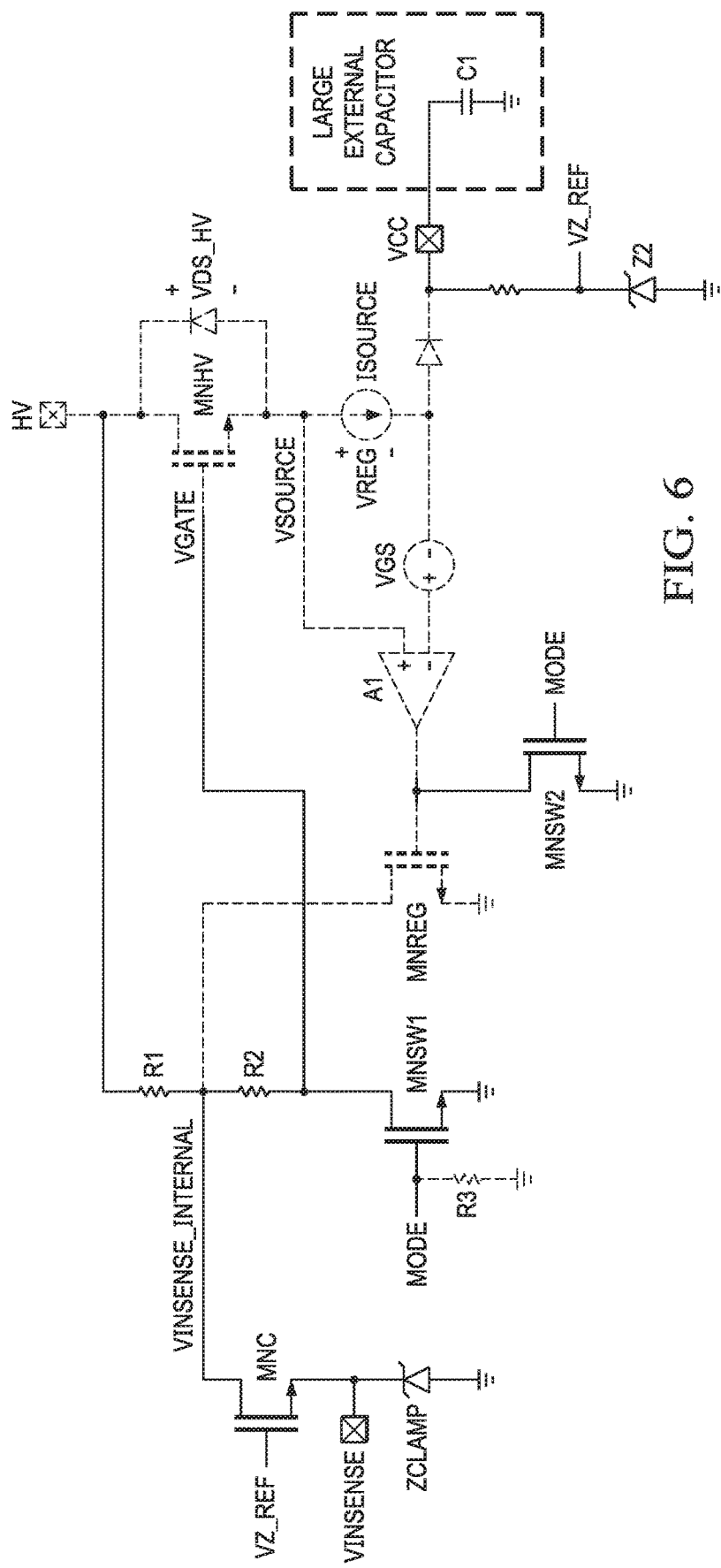
FIG. 6 depicts the circuit diagram of FIG. 4 operating in a voltage sensing mode.

FIGS. 5 and 6 are representations of the circuit 400 of FIG. 4 demonstrating operation in startup and sensing modes, respectively. The same reference numbers are used in FIGS. 5 and 6 to identify components and signals introduced with respect to FIG. 4. Additionally, active portions of the circuit 400 thus are represented by solid black lines and reference characters whereas inactive portions are represented by dotted or grayed out lines and reference characters. In each of FIGS. 5 and 6, an external capacitor C1 is coupled between the output terminal VCC and the ground terminal. The capacitor C1 can be used to supply an input voltage to an HV controller such as disclosed herein.

Referring to FIG. 5, the circuit 400 is operating in the startup mode such as in response to the MODE signal being grounded or pulled low (e.g., logic 0). The active startup circuit 402 thus includes MNHV, ISOURCE and diode D1, which are coupled to drive the external capacitor C1 based on the voltage supplied at the HV input. The active startup circuit also include the feedback circuit 410, namely, amplifier 412, threshold VGS, MNREG, and resistors R1 and R2. Because MNSW1 and MNSW2 are turned off during the startup mode, the feedback circuit 410 is configured to dynamically bias the transistor MNHV as a cascode by regulating the voltage VREG across the current source ISOURCE. The dynamic biasing reduces voltage overstress and helps to maintain the minimum headroom for the low voltage circuitry (not shown) used to implement the current source ISOURCE. In the HV startup mode (e.g., MODE signal is logic 0), the HV startup circuit 402 thus is configured to provide a large sourcing current (ISOURCE=ISTARTUP) to the output terminal VCC to quickly charge the external capacitor C1. Once the external capacitor C1 is sufficiently charged (e.g., the voltage at VCC), the circuit 400 can change from the HV startup mode to the HV sensing mode, such as in response to the MODE signal being driven high (e.g., to a logic 1).

As shown in FIG. 6, the sensing circuit 404 is active to enable sensing the voltage at the HV input terminal during the HV sensing mode. The active sensing circuit 402 includes transistor switch devices MNSW1 and MNSW2, resistors R1 and R2, clamp circuitry MNC and Z1 and reference generator circuitry R4 and Z2. Driving the MODE signal high disables HV startup circuit 402 by shorting the gate of the MNHV to ground through MNSW1. Grounding the gate of MNHV when HV Startup is inactive helps minimize breakdown drift over the life time of the circuit. Turning on MNSW1 also grounds R2, which causes R1 and R2 to form a voltage divider between the HV input terminal and the ground terminal to enable high voltage sensing. For example, when the mode signal is high, the voltage at the node 414 can be represented as:

$$V\_Node\_414 = \frac{R2}{R2 + R1} HV.$$

The node 414 can reach voltages that could potentially overstress low voltage circuits during high voltage startup. The node 414 cannot be clamped directly in most cases because the voltage at the gate of MNHV may need to reach a high voltage bias, such as 32V in order to charge VCC to 28V. Accordingly, in this example, the clamp circuit (e.g., transistor MNC and Zener Z1) is configured to clamp the voltage at the VINSENSE terminal. For example, the transistor MNC is configured to clamp the voltage at the VINSENSE node by increasing the impedance from VINSENSE to the gate of MNHV as VINSENSE approaches VZ_REF−VGS_MNC, where VGS_MNC represents the gate-to-source voltage of the transistor MNC. The Zener diode Z1 is included to help ensure that VINSENSE does not increase beyond the cascode clamp due to leakage by the transistor MNC.

The voltage at the output terminal VINSENSE can be approximated by following equations for each of the startup and sensing modes of operation:

$$VINSENSE_{(MODE=HIGH)} = \max\left(\frac{R2}{R1 + R2}HV, VZREF - VGS\_MNC\right) \quad \text{Equation 2}$$

$$VINSENSE_{(MODE=LOW)} = \max(V\_NODE\_414, VZREF - VGS\_MNC) \quad \text{Equation 3}$$

In view of the foregoing, a multi-mode HV circuit can be implemented to provide high voltage sensing functionality in addition to high voltage startup with the footprint size that is comparable to that of a single high voltage device. Thus, the circuit can afford up to about to 50% reduction or savings in area compared to existing approaches when both HV startup and line sensing are both needed. The ability of the HV sensing circuit 404 to accurately attenuate the HV input terminal for use with low voltage circuits affords several advantages. For example, it enables accurate brown-out and over-voltage protection without requiring an extra pin or a potentially less accurate reconstruction that may require several switching cycles in a switch mode power supply. Such circuitry may further enable accurate and fast line feed forward. The sensed voltage at VINSENSE may also be utilized to generate a Line Voltage Reference for power factor correction such as to achieve high power factor and low distortion, without requiring any additional pins or external components. Moreover, the gate biasing of MNHV (e.g., by feedback circuit 410) helps to minimize the breakdown drift over the silicon's lifetime. This allows the device and system to achieve a higher voltage rating in commercial products. Additionally, the High Voltage Resistor R1 can be easily constructed on top of the HV transistor MNHV without any additional masks or area, while the JFET requires significantly more area.

Figure 7:
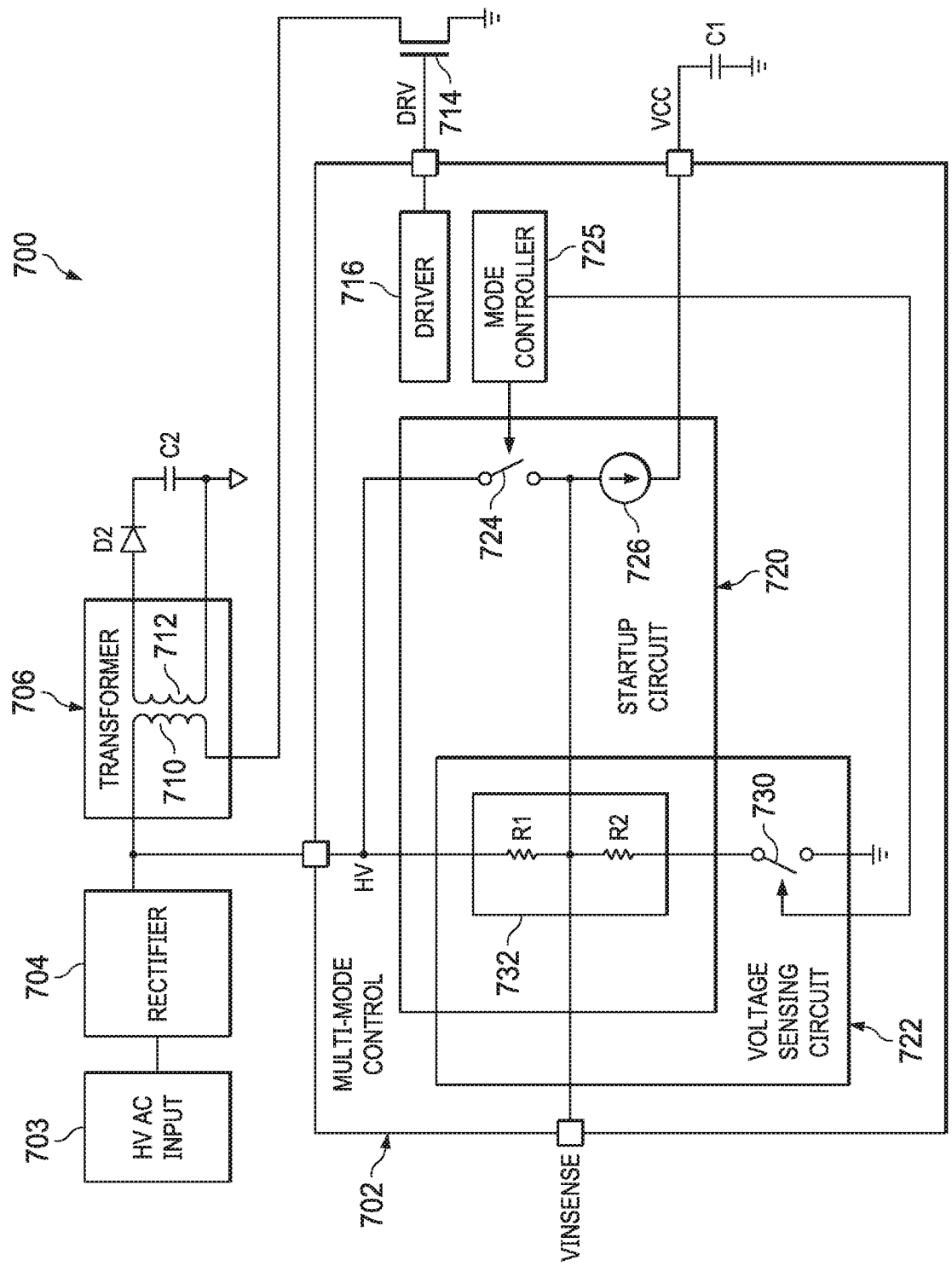
FIG. 7 is a block diagram depicting an example of a system implementing a multi-mode high voltage circuit.

FIG. 7 is a block diagram depicting an example of a system 700 implementing a high voltage multi-mode controller circuit 702. For example, the circuit 702 may be implemented according to the examples disclosed herein, such as the circuit 300 or 400. The circuit 702 may be implemented as a system on an IC chip (SOIC), a multi-chip module (MCM) in an integrated package or as an arrangement of components on a printed circuit board. The system 700 includes an HV AC input supply 703 that is configured to provide an HV AC input signal to a rectifier 706. In an example, the rectified line voltage is approximately 325 V, but may be set to other voltages according to application requirements. The rectifier 704 is configured to convert the AC input signal to a rectified HV line voltage.

The rectified line voltage is also supplied to a transformer 706, such as to a primary winding 710 thereof. The transformer 706 includes a secondary winding 712 that is coupled to drive an output thereof. A diode D2 and a capacitor C2 are coupled between the transformer output and the electrical ground node. In an example, the HV input terminal (e.g., a pin of a PCB or IC chip) of the circuit 702 is coupled to the output of the rectifier 704 to receive the rectified line voltage. In another example, the HV input terminal may be coupled to the drain of the power MOSFET 714.

In this example, the system includes a power transistor device 714, such as a power MOSFET, which is coupled between the output of the primary winding and the electrical ground node. The power transistor 714 has a control input (e.g., gate) coupled to a driver output (DRV) of the controller circuit 702. For example, the controller circuit includes a driver 716 configured to generate a driver signal to drive the gate of the power transistor for controlling current through the primary winding 710, which in turn controls an output of the transformer 706.

As mentioned, the multi-mode controller circuit 702 may be implemented according to the example circuits 300 or 400 disclosed herein. Accordingly, additional information about the configuration of such circuits and their operation in startup and sensing modes may be obtained with reference to FIGS. 3-6. In the example of FIG. 7, the multi-mode controller circuit 702 includes a startup circuit 720 and a voltage sensing circuit 722. The startup circuit 720 includes a first switch 724 coupled between the HV input and the output terminal VCC. An external capacitor C1 is coupled to the output terminal VCC. The first switch has a control input that is coupled to receive a MODE signal from a mode controller 725. For example, the mode controller 725 is configured to provide the mode signal to control which mode of operation is active, the startup mode or the voltage sensing mode. In an example, the mode controller 725 is implemented as digital or analog logic that controls the mode based on the voltage at VCC output. For example, at initial power up when the HV AC input supplies the AC voltage, the capacitor C1 is uncharged (or only partially charged), such that the controller operates the circuit 702 in the startup mode. Once the voltage at VCC reaches a charging voltage (e.g., about 28 V), the mode controller provides the MODE signal to turn off the first switch 724 and to turn on the second switch. Thus, the mode controller 725 is configured to control the operating modes as to be mutually exclusive modes of operation for the circuit 702. While the mode controller 725 is shown in FIG. 7 to be within the circuit 702, in other examples, the mode controller may be external to the circuit, such as to supply the MODE signal to an input terminal of the circuit.

A current source 726 is coupled in series with the first switch 724 between the voltage input and the output terminal. The current source 726 is configured to provide a startup current (e.g., corresponding to ISOURCE) to the output terminal VCC in response to the first switch 724 being activated during a first operating mode (e.g., the startup mode). The startup current thus charges the external capacitor C1 to a charging voltage.

In an example, the startup circuit 720 include a feedback circuit (not shown) such as may be implemented according to feedback circuit 410. The feedback circuit includes the first and second resistors coupled between the HV input terminal and a control input of the first switch 724. As mentioned, the feedback circuit is configured to regulate a voltage drop across the current source 726 by controlling a voltage drop across the first resistor during the first operating mode (e.g., the startup mode).

The voltage sensing circuit 722 includes a second switch 730 connected in series with first and second resistors R1 and R2 between the HV input terminal and a ground node. A node between the first and second resistors R1 and R2 defines a sense node VINSENSE. The second switch 730 is configured to conduct current through the second resistor to form a voltage divider 732 between the HV input and the ground node during a second operating mode (e.g., the sensing mode), such that the voltage divider provides a sensed voltage at the sense node VINSENSE. The sensed voltage is a fractional part of a voltage at the HV input (e.g., an attenuated representation thereof).

Figure 8:
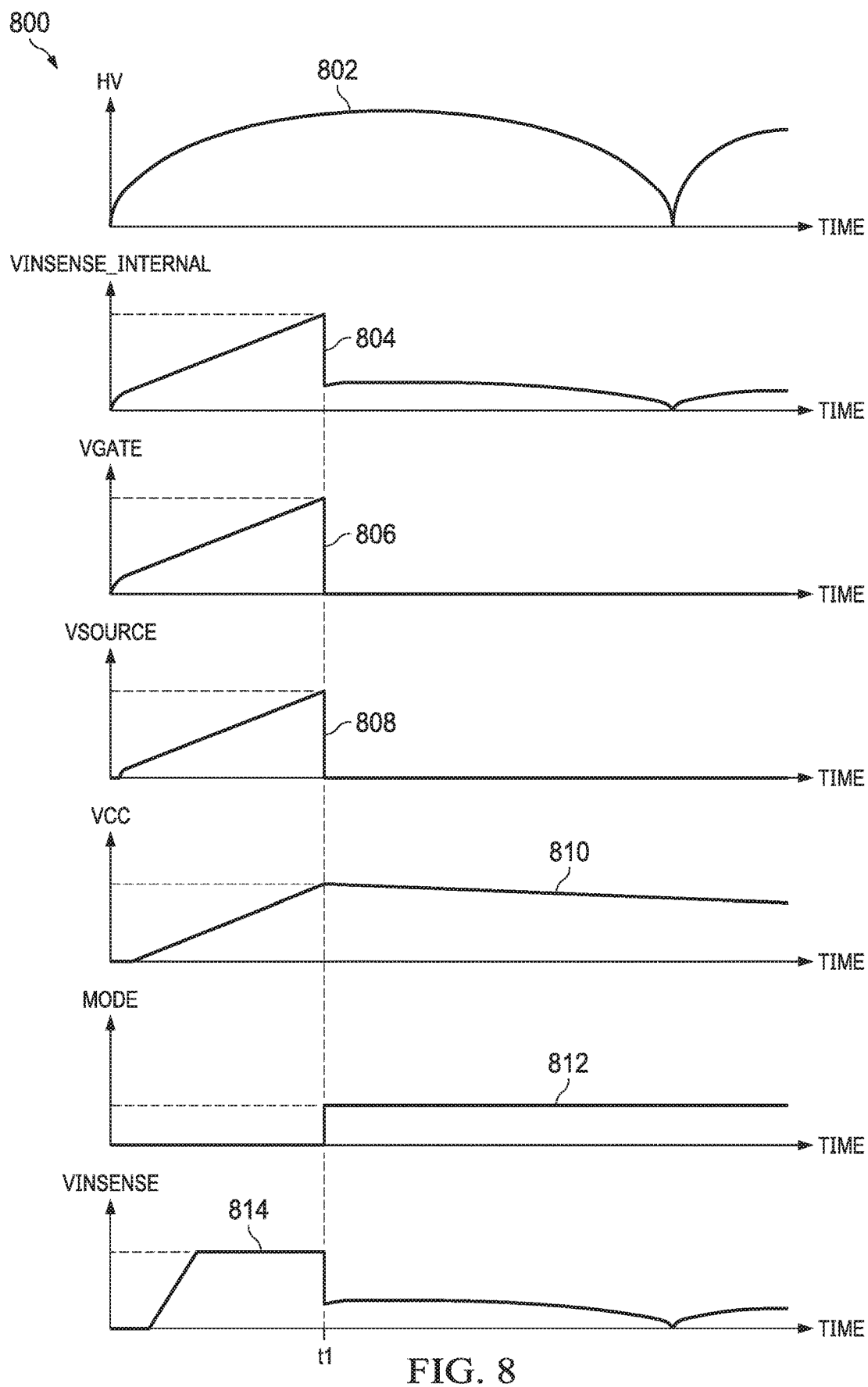
FIG. 8 is a diagram of waveforms for the circuit of FIG. 4 showing operating in high-voltage startup and voltage sensing modes.

FIG. 8 is a diagram 800 of example waveforms for the system 700 of FIG. 4 as a function of time and showing operation in high-voltage startup and voltage sensing modes. In this example, a waveform 802 is the voltage at the HV input, such as a rectified line voltage (e.g., from rectifier 704 as described with respect to FIG. 7). An internal node voltage, demonstrated at VINSENSE_INTERNAL (e.g., corresponding to the voltage at node 414 between R1 and R2) increases generally linearly during the startup mode. For example, the voltage VINSENSE_INTERNAL varies generally linearly during the startup mode up to a maximum voltage of VCC_MAX+VGS+VgsMNHV, where VgsMNHV is the gate-to-source voltage of the LDMOS MNVH. Thus, when the MODE signal 812 changes from low to high, the VINSENSE_INTERNAL decreases and tracks the HV input waveform 802 (e.g., attenuated by the voltage divider of R1 and R2).

The voltage (VGATE) at the gate of MNHV is equal to the VINSENSE_INTERNAL during the startup mode (up to time t1) while the MODE signal is logic 0, such as up to VCC_MAX+VGS+VgsMNHV. In response to the MODE signal going high (logic 1), however, VGATE is pulled low (e.g., through MNSW1). A source voltage VSOURCE, which is regulated by feedback circuit 410, provides a waveform 808, which may be equal to VCC_MAX+VGS. Thus, VSOURCE is equal to the maximum of VGATE−VGS_MNHV and 0V. VSOURCE is equal to the maximum of VGATE−VgsMNHV and 0V during startup mode (up to time t1) while the MODE signal is logic 0. In response to the MODE signal going high (logic 1), the VSOURCE waveform 808 is pulled to 0V. The voltage waveform 810 provides the voltage at the VCC output terminal based on the charge of the external capacitor C1. Initially, in this example, VCC is at 0V and then increases linearly according to current supplied during the startup mode by the transistor MNHV, which is controlled by feedback circuit 410. The capacitor stops charging in response to the MODE signal going high (logic 1) such as by detecting a desired VCC_MAX. After time t1, the VCC waveform 808 slowly appears to discharge (e.g., based on controller circuitry using the charge as a power supply). A waveform 814 demonstrates the voltage at the VINSENSE output terminal of the circuit 400. Thus, initially, VINSENSE is at 0V and then ramps up to VZ_REF−VGS_MNC during the startup mode. At time t1, in response to switching from the startup to sensing mode, the sense voltage VINSENSE is provided by the voltage divider and thus is an attenuated version of the voltage at the HV input terminal.

What have been described above are examples. It is, of course, not possible to describe every conceivable combination of components or methods, but one of ordinary skill in the art will recognize that many further combinations and permutations are possible. Accordingly, the disclosure is intended to embrace all such alterations, modifications, and variations that fall within the scope of this application, including the appended claims. As used herein, the term "includes" means includes but not limited to, the term "including" means including but not limited to. Additionally, where the disclosure or claims recite "a," "an," "a first," or "another" element, or the equivalent thereof, it should be interpreted to include one or more than one such element, neither requiring nor excluding two or more such elements.

What is claimed is:

1. A circuit comprising:
    a first switch device having a control terminal, a first current terminal connected to a voltage input terminal, and a second current terminal coupled to an output terminal;
    a first resistor coupled between the voltage input terminal and a sense terminal;
    a second resistor coupled between the sense terminal and the control terminal of the first switch device;
    a second switch device having a first current terminal coupled to the second resister and to the control terminal of the first switch device, and having a second current terminal coupled to an electrical ground terminal; and
    a voltage clamp coupled between the sense terminal and the electrical ground terminal.

2. The circuit of claim 1, further comprising a current source having a first current source terminal coupled to the second current terminal of the first switch device and a second current source terminal coupled to the output terminal, wherein the first switch device is configured to enable the currant source to supply a startup current to the output terminal in response to a control signal enabling a high-voltage startup operating mode.

3. The circuit of claim 2, further comprising a feedback circuit coupled to the first current source terminal and the second current source terminal and configured to regulate a voltage across the current source.

4. The circuit of claim 3, wherein the feedback loop includes:
    an amplifier having first and second inputs coupled to the first current source terminal and the second current source terminal respectively, and an output;
    a transistor device having first and second current terminals coupled between the sense terminal and the electrical ground, and a control terminal coupled to the output of the amplifier.

5. The circuit of claim 4, wherein the first current terminal of the transistor device is coupled to the sense terminal such that the feedback circuit is configured to control a voltage drop across the first resistor to regulate the voltage across the current source.

6. The circuit of claim 4, wherein in response to turning on the second switch device, the second terminal of the second resistor is connected to the electrical ground terminal such that the first resistor and the second resistor form a voltage divider between the voltage input and the electrical ground terminal in which the sense terminal is configured to provide a sensed voltage that is proportional to the voltage input.

7. The circuit of claim 6, including
a reference generator coupled to the output terminal, the reference generator configured to provide a reference voltage based on a voltage at the output terminal; and
wherein the voltage clamp includes a control input to receive the reference voltage, and the voltage clamp is configured to clamp the voltage at the sense terminal based on the reference voltage.

8. The circuit of claim 7,
wherein the reference generator comprises a first Zener diode coupled in series with a resistor between the output terminal and the electrical ground, and the first Zener diode and the resistor are coupled to a control terminal of the transistor device; and
wherein the voltage clamp includes a second Zener diode coupled between the second current terminal of the transistor device and the electrical ground, the second current terminal of the transistor device being coupled to the output terminal.

9. The circuit of claim 1, wherein the control input of the first switch device is connected to the second terminal of the second resistor, wherein in response to turning on the second switch device, the control input of the first switch device is connected to the electrical ground terminal through the second switch device.

10. The circuit of claim 9, wherein the first switch device includes a power transistor device having a control input coupled to the second terminal of the second resistor.

11. The circuit of claim 10, wherein the power transistor device includes a laterally diffused metal oxide semiconductor (LDMOS) transistor device having a control terminal coupled to the second terminal of the second resistor.

12. The circuit of claim 1, wherein a control input of the second switch device is adapted to receive a mode signal that indicates in which of mutually exclusive operating modes the circuit is operating, the first switch device configured to provide current to the output terminal during a first of the operating modes when the mode signal turns off the second switch device, the second switch device being configured to turn on and connect the second terminal of the second resistor to the electrical ground terminal during a second of the operating modes based on the mode signal such that the voltage at the sense terminal is proportional to the voltage input.

13. A device comprising:
a startup circuit including:
a first switch having a control terminal, a first current terminal connected to a voltage input terminal, and a second current terminal;
a current source having a first terminal coupled to the second current terminal of the first switch and a second terminal coupled to an output terminal, the current source configured to provide a startup current to the output terminal in response to the first switch being turned on during a first operating mode; and
a voltage sensing circuit including:
a second switch having a control terminal, a first current terminal and a second current terminal coupled to a ground terminal;
a first resistor having a first terminal coupled to the voltage input terminal and a second terminal; and
a second resistor coupled between the second terminal of the first resistor and the first current terminal of the second switch;

wherein the second switch is configured to conduct current through the second resistor to form a voltage divider between the voltage input and the ground terminal during a second operating mode, such that the voltage divider provides a sensed voltage at an intermediate sense terminal thereof that is a fractional part of a voltage at the voltage input;
wherein the second switch is configured to couple the control terminal of the first switch to the ground terminal during the second operating mode, which forms the voltage divider from the first and second resistors between the voltage input and the ground terminal; and
wherein the first and second operating modes are mutually excluside for the device.

14. The device of claim 13, wherein the startup circuit further includes a feedback circuit in which the first and second resistors are coupled between the voltage input and the control terminal of the first switch, the feedback circuit being configured to regulate a voltage drop across the current source by controlling a voltage drop across the first resistor during the first operating mode.

15. The device of claim 14, wherein the feedback circuit includes:
a transistor having a first current terminal coupled to the intermediate sense terminal, and a second current terminal coupled to the ground terminal; and
a comparator circuit configured to control the transistor to regulate the voltage drop across the current source during the first operating mode by increasing or decreasing the voltage drop across the first resistor.

16. The device of claim 13, wherein the voltage sensing circuit further includes:
a reference generator configured to provide a reference voltage based on a voltage at the output terminal; and
a clamp circuit coupled between the intermediate sense terminal and a sense output terminal, the clamp circuit being configured to clamp a voltage at the sense output terminal during the first operating mode based on the reference voltage.

17. An integrated circuit chip comprising the device of claim 13.

18. A system, comprising:
a first switch coupled between a voltage input and an output terminal, the first switch having a control input;
a current source in series with the first switch between the voltage input and the output terminal, the current source configured to provide a startup current to the output terminal in response to the first switch being turned on during a startup operating mode;
a feedback circuit that includes first and second resistors coupled between the voltage input and a control input of the first switch, the feedback circuit being configured to regulate a voltage drop across the current source during the startup operating mode by controlling a voltage drop across the first resistor;
a capacitor coupled to the output terminal and configured to charge in response to the startup current; and
a voltage sensing circuit comprising a second switch connected in series with the first and second resistors and a ground terminal, wherein the second switch is configured to conduct current through the second resistor to form a voltage divider between the voltage input and the ground terminal during a sensing operating mode in which a sense terminal between the first and second resistors provides a sensed voltage that is a fractional part of a voltage at the voltage input, and wherein the sensing operating mode is mutually exclusive from the startup operating mode.

19. The system of claim 18, further comprising:
a reference generator configured to provide a reference voltage based on a voltage at the output terminal; and
a clamp circuit coupled between the sense terminal and a sense output terminal, the clamp circuit being configured to clamp a voltage at the sense output terminal during the startup operating mode based on the reference voltage.

20. The system of claim 19, further comprising a controller having an input coupled to the sense output terminal, the controller configured to control which of the sensing operating mode and the startup operating mode is enabled based on a charge of the capacitor.

* * * * *